United States Patent

Rensmann et al.

[11] 3,896,082
[45] July 22, 1975

[54] EPOXY POWDER COATINGS AND METHOD THEREFOR

[75] Inventors: Leo Rensmann, Dorsten; Felix Schülde, Wulfen; Johann Obendorf, Dorsten; Kurt Neubold, Bottrop, all of Germany

[73] Assignee: Veba-Chemie AG, Gelsenkirchen-Buer, Germany

[22] Filed: Oct. 4, 1973

[21] Appl. No.: 403,687

[30] Foreign Application Priority Data
Oct. 5, 1972 Germany.............................. 2248776

[52] U.S. Cl. .......... 260/47 EN; 260/2 N; 260/2 BP; 260/37 EP; 260/75 EP; 260/78.4 EP; 260/830; 260/830 TW
[51] Int. Cl. ............................................. C08g 30/16
[58] Field of Search ........ 260/2 N, 47 EM, 78.4 EP, 260/75 EP, 830 TW, 2 BP; 117/23

[56] References Cited
UNITED STATES PATENTS

| | | | |
|---|---|---|---|
| 3,324,198 | 6/1967 | Gruver | 260/2 N |
| 3,549,592 | 12/1970 | Godfrey et al. | 260/2 N |
| 3,763,102 | 10/1973 | Hoffmann et al. | 260/2 EC |

OTHER PUBLICATIONS
Epoxide Resins, by Potter, 1970, (p. 163–167).

*Primary Examiner*—Morris Liebman
*Assistant Examiner*—T. Pertilla
*Attorney, Agent, or Firm*—Burgess, Dinklage & Sprung

[57] ABSTRACT

Imidazoline derivatives having the formula

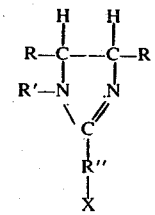

are used as hardeners for powder coating systems based on 1,2-epoxy compounds having at least one 1,2-epoxy group in the molecule and a lower softening point above 40°C.

3 Claims, No Drawings

EPOXY POWDER COATINGS AND METHOD THEREFOR

BACKGROUND

The subject matter of the invention is a method of making coatings on the basis of powder varnishes of 1,2-epoxy compounds, special cyclic amidines and conventional additives.

The subject matter of the invention is a method of making coatings on the basis of powder varnishes of 1,2-epoxy compounds, special cyclic amidines and conventional additives.

Powder varnishes are being used increasingly for the making of coatings. Powder varnishes are finely powdered synthetic compounds consisting of a thermosetting resin, a cross-linking agent, i.e., hardener, and additives such as pigments, dyes, fillers, leveling agents, etc.

Among the thermosetting powder varnish systems, coating powders based on epoxy resins are used predominantly.

It is the prior art to use as hardeners for epoxy resin powder varnishes such substances as amines, acid anhydrides, boron trifluoride complexes, polyamides, dicyandiamide or substituted dicyandiamide. The use of these conventional hardeners in accordance with the present state of the art leads to the following disadvantages: the powder varnish systems require relatively high setting temperatures and long setting times, the coatings have poor resistance to washing solutions, dishwater and hot water, they do not have optimum leveling characteristics and gloss, they are not entirely pore-free and have limited resistance to elevated temperature. Furthermore, at the setting temperatures commonly used, some yellowing, especially of light colors, is observed, since the epoxy resins of the prior art have a strong yellowing tendency.

SUMMARY

It was the aim of the present invention to find substances suitable as cross-linking agents for epoxy resin powder varnishes, which would result in powder varnish systems not encumbered by the above-described disadvantages.

It has surprisingly been found that powder varnishes may be used without the described disadvantages if, in the process of preparing powder varnish-based coatings through the reaction at elevated temperature of finely divided mixtures of cyclic amidines, the conventional varnish additives, and 1,2-epoxy compounds having at least one 1,2-epoxy group in the molecule and a lower softening point above 40°C, one uses as cyclic amidines imidazoline derivatives of the general formula

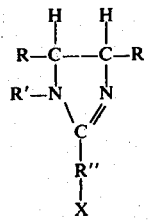

wherein R represents hydrogen or an alkyl or aryl radical, R′ represents a cycloalkyl, heterocycloalkyl or R radical, R″ an alkyl or aryl substituted or unsubstituted alkylene or arylene radical and X represents hydrogen or a radical

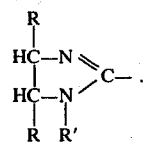

By the use of these imidazoline derivatives as hardeners for powder varnish systems based on 1,2-epoxy compounds, coatings are obtained which are technologically as well as optically considerably superior to powder varnishes formulated with conventional hardeners.

DESCRIPTION

In addition to the high gloss of the varnish films and their freedom from pores, the physical tests produce the best results obtained for coatings applied in powder form. Outstanding are great ability to withstand such stresses as shock, bending and scratching, and excellent resistance to washing solutions and hot water. The films withstand temperatures of 90° and 120°C for several hours in washing solutions, dishwater and hot water without appreciable alteration.

It has furthermore been found that an important technical advance has been accomplished by the use of these imidazoline derivatives as hardeners in epoxy resin powder varnishes because the required setting temperatures are substantially lower and the setting times substantially shorter than in powder varnish systems formulated with conventional hardeners. Optimum qualities are obtained in the coating under the following heat treatment conditions:

| Setting Time | Setting Temperature |
|---|---|
| 5 minutes | 200°C |
| or 10 minutes | 180°C |
| or 15 minutes | 160°C |
| or 20 minutes | 140°C |

Yellowing of the films can thus be prevented, since the margin between the setting temperature and the yellowing temperature is much wider than it is when conventional hardeners are used.

Suitable imidazoline derivatives in the meaning of the present invention which correspond to the general formula given above are, for example, those having aryl-substituted or unsubstituted alkyl radicals, those having alkyl-substituted or unsubstituted aryl radicals, and those which contain a second imidazoline group through an alkylene or arylene group, such as 2-methylimidazoline, 2,4-dimethylimidazoline, 2-ethylimidazoline, 2-ethyl-4-methylimidazoline, 2-benzylimidazoline, 2-phenylimidazoline, 2-(o-tolyl)-imidazoline, 2-(p-tolyl)-imidazoline, tetramethylene-bis-imidazoline, 1,1,3-trimethyl-1,4-tetramethylene-bis-imidazoline, 1,3,3-trimethyl-1,4-tetramethylene-bis-imidazoline, 1,1,3-trimethyl-1,4-tetramethylene-bis-4-methylimidazoline, 1,3,3-trimethyl-1,4-tetramethylene-bis-4-methylimidazoline, 1,2-phenylene-bis-imidazoline, 1,3-phenylene-bis-imidazoline, 1,4-phenylene-bis-imidazoline, 1,4-phenylene-bis-4-methylimidazoline, etc. Mixtures of the imidazoline derivatives may also be used in accordance with the invention.

The imidazoline derivatives which are usable according to the invention may be prepared by conventional methods from substituted or unsubstituted geminal diamines and aliphatic or aromatic mononitriles or dinitriles, respectively, in the presence of elemental sulfur or sulfuryl chloride as catalyst.

The above-described imidazoline derivates are used in amounts of 2 to 10 wt-%, preferably 3 to 5 wt-% with reference to the total amount of the powder varnish.

Suitable for the preparation of the finely divided mixtures which are to be used as powder varnishes are 1,2-epoxy compounds having at least one 1,2-epoxy group in the molecule and a lower melting point of more than 40°C, that is, compounds which correspond to this characteristic, are, on the one hand, polyepoxy compounds which are solid at 40°C and below, including higher-molecular compounds (so-called solid resins), and those which are solid as a result of their symmetrical structure or the size of the carbon systems bound to the 1,2-epoxy group, and on the other hand those which have been prepared by the reaction of liquid 1,2-epoxy compounds having more than one epoxy group per molecule with primary or secondary amines in such quantity that the adduct contains at least an average of one more 1,2-epoxy group per molecule (so-called adduct hardener).

The 1,2-epoxy compounds may be either saturated or unsaturated, and they may be aliphatic, cycloaliphatic, aromatic or heterocyclic. They may furthermore contain substituents which under the conditions of mixture or reaction do not cause any undesired side-reactions. Alkyl or aryl substituents, hydroxyl groups, ether groupings and the like do not cause side-reactions.

Of the solid resins those preferred for this application are 1,2-epoxy compounds having more than one epoxy group in the molecule, whose epoxy equivalent weight is between 500 and 1,000. These are the solid, polymeric polyglycidyl polyethers of 2,2-bis-(4-hydroxyphenyl)-propane, which are obtained, for example, by the reaction of 2,2-bis-(4-hydroxyphenyl)-propane with epichlorhydrine in molar ratios of 1 : 1.9 to 1.2 (in the presence of an alkali hydroxide in the aqueous medium). Polymeric polyepoxides of this kind may also be obtained through the reaction of a polyglycidyl ether of 2,2-bis-(4-hydroxyphenyl)-propane with less than the equimolecular amount of bivalent phenol, preferably in the presence of a catalyst such as a tertiary amine, a tertiary phosphine or a quaternary phosphonium salt. The polyepoxide may also be a solid epoxidized polyester which has been obtained, for example, through the reaction of a polyvalent alcohol and/or a polybasic carboxylic acid or its anhydride with a low-molecular polyepoxide. Examples of such polyepoxides of low molecular weight are liquid diglycidyl ether of 2,2-bis-(4-hydroxyphenyl)-propane, diglycidylphthalate, diglycidyladipate, diglycidyltetrahydrophthalate, diglycidylhexahydrophthalate, diglycidylmaleate and the 3,4-epoxycyclohexylmethylester of 3,4-epoxycyclohexanecarboxylic acid.

Mixtures of solid polyepoxides may also be used, such as for example a mixture of a polyepoxide whose softening point is between 120° and 160°C and a polyepoxide having a softening point between 60° and 80°C (softening point determined by the mercury method of Durrans). Suitable mixtures contain between 30 and 50 wt-% of a solid polyglycidyl ether of 2,2-bis-(4-hydroxyphenyl)-propane with an epoxy equivalent weight between 1,650 and 2,050 and a softening point of 120° to 160°C, and between 50 and 70 wt-% of a solid polyglycidyl polyether of 2,2-bis-(4-hydroxyphenyl)-propane with an epoxy equivalent weight between 450 and 525 and a softening point of 60° to 80°C.

If a high epoxy functionality appears desirable, a preferred polyepoxide is the polyglycidyl ether of 1,1,2,2-tetra-(hydroxyphenyl)-ethane.

As previously mentioned, adduct hardeners are also suitable, in addition to the so-called solid resins, for the practice of the method of the invention. Such solid adduct hardeners may be prepared, for example, from liquid polyepoxides of poly-unsaturated hydrocarbons such as vinyl cyclohexene, dicyclopentadiene and the like, epoxy ethers of polyvalent alcohols and phenols etc., and aliphatic, cycloaliphatic and aromatic diamines. For such an adduct to be suitable, its lower softening point must be above 40°C.

To improve the leveling characteristics of the varnishes, so-called leveling agents are added to them during their preparation. These agents may be chemical compounds or mixtures of chemical compounds of widely varying chemical types, such as polymeric or monomeric compounds, acetals such as polyvinylformal, polyvinylacetal, polyvinylbutyral or polyvinylacetobutyral, or di-2-ethylhexyl-i-butyraldehydeacetal, di-2-ethylhexyl-n-butyraldehydeacetal, diethyl-2-ethylhexanolacetal, di-n-butyl-2-ethylhexanolacetal, di-i-butyl-2-ethylhexanol-acetal, di-2-ethylhexylacetaldehydeacetal, and the like, ethers, such as the polymeric polyethyleneglycols and polypropyleneglycols, copolymers of n-butylacrylate and vinylisobutylether, ketone-aldehyde condensation resins, solid silicone resins or mixtures of zinc soaps, of fatty acids and aromatic carboxylic acids and the like. Products such as Modaflow are also offered commercially for this product, whose chemical character is unknown to its consumers and about which it is only known that it is a complex, polymeric, effective liquid. Such leveling agents may be contained in the batches in amounts of 0.2 to 5.0% of the weight of the entire powder varnish.

The other components of the powder varnish mixture, such as pigments, dyes, fillers, etc., may be present in a wide range of proportions with respect to the 1,2-epoxy compounds.

After the powder varnish is applied to the objects to be coated the latter are heated at temperatures of 130° to 210°C, preferably 140° to 180°C, to set them. Thereafter the coating will have the above-described advantages.

Prior to use the powder varnish components are intimately mixed, extruded and then crushed. For practical application a particle size of less than 100 microns is preferably striven for, the maximum particle size to be between 30 and 50 microns.

The application of the powder varnish to the bodies to be coated is accomplished by known methods, e.g., by electrostatic powdering, fluidized-bed sintering, electrostatic fluidized-bed sintering, etc.

The process of the invention is illustrated by the following examples:

GENERAL DESCRIPTION OF THE METHOD APPLIED

The 1,2-epoxy compounds with the special characteristics, known in practice as epoxy resins, are mixed with the imidazoline derivatives serving both as cross-linking agents and as hardeners, with the pigments and with the additives such as leveling agents, in the stated ratios by weight, and then are extruded and then crushed. The particle size of the powder varnish components was less than 100 microns. The frequency distribution of the particle size had its maximum in the range from 30 to 50 microns. These finely granular mixtures are then applied to steel sheet by electrostatic dusting and then set at the stated temperatures for the stated lengths of time. The characteristics of the varnish films obtained are subjected to the tests listed at the end.

EXAMPLE 1

2-phenylimidazoline was made into a powder varnish or sintering powder with titanium dioxide and an epoxy resin plus a small amount of leveling agent in the following proportions:

| Composition of the Powder Varnish | |
|---|---|
| Solid epoxy resin on the basis of an adduct of 2,2-bis-(4-hydroxyphenyl)-propane (diane) and epichlorhydrin, which had been subjected to an HCl cleavage and had then been reacted with additional diane and which, according to the manufacturer, had an epoxy equivalent weight ranging between 900 and 1000, which corresponds to an epoxy value of 0.10 to 0.11. Has a softening range of 90 – 100°C. | 55.5 wt-% |
| 2-phenyl-imidazoline: | 4.0 wt-% |
| TiO$_2$ in powder form: | 40.0 wt-% |
| Leveling agent, obtainable commercially under the name "Modaflow": | 0.5 wt-% |

This formulation was applied to the test body and after 5 minutes setting at 200°C it was tested with the following results:

| | |
|---|---|
| Coating thickness: | 60 – 70 μ |
| Gloss (Gardner, 60°): | 100% |
| Erichsen cupping (DIN 53,156): | >10 mm |
| Checking (DIN 53,151): | 0 |
| Mandrel bending test (DIN 53,152): | <2 mm diam. |
| Buchholz hardness (DIN 53,153): | 100 |
| Ball impact test (Gardner): | >80 in lb |

EXAMPLE 2

2-benzylimidazoline was formulated with the epoxy resin of Example 1:

| Composition of the Powder Varnish | |
|---|---|
| Epoxy resin | 54.5 wt-% |
| 2-benzylimidazoline | 5.0 wt-% |
| Titanium dioxide in powder form | 40.0 wt-% |
| Leveling agent (as in Example 1) | 0.5 wt-% |

After 15 minutes of setting the coating at 160°C the following results were obtained:

| | |
|---|---|
| Coating thickness: | 80 – 90 microns |
| Gloss (Gardner, 60°): | 100% |
| Erichsen cupping (DIN 53,156): | 9 – 10 mm |
| Checking (DIN 53,151): | 0 |
| Mandrel bending test (DIN 53,152): | <2 mm diam. |
| Buchholz hardness (DIN 53,153): | 111 |
| Ball impact test (Gardner): | 20 in lb |

EXAMPLE 3

2-(p-Tolyl)imidazoline was formulated with the epoxy resin of Example 1:

| Composition of the Powder Varnish | |
|---|---|
| Epoxy resin | 55.5 wt-% |
| 2-(p-tolyl)imidazoline | 4.0 wt-% |
| TiO$_2$ in powder form | 40.0 wt-% |
| Leveling agent (as in Example 1) | 0.5 wt-% |

After the coating had been set for 10 minutes at 180°C the following results were obtained:

| | |
|---|---|
| Coating thickness: | 65 – 70 microns |
| Gloss (Gardner, 60°): | 100% |
| Erichsen cupping (DIN 53,156): | 10 mm |
| Checking (DIN 53,151): | 0 |
| Mandrel bending test (DIN 53,152): | <2 mm diam. |
| Buchholz hardness (DIN 53,153): | 100 |
| Ball impact test (Gardner): | 80 in lb |

EXAMPLE 4

Tetramethylene-bis-imidazoline was formulated with the epoxy resin of Example 1:

| Composition of the Powder Varnish | |
|---|---|
| Epoxy resin | 56.5 wt-% |
| Tetramethylene-bis-imidazoline | 3.0 wt-% |
| TiO$_2$ in powder form | 40.0 wt-% |
| Leveling agent (of Example 1) | 0.5 wt-% |

After 20 minutes of setting the powder coating at 140°C the following results were obtained:

| | |
|---|---|
| Coating thickness: | 65–75 μ |
| Gloss (Gardner, 60°): | 100% |
| Erichsen cupping (DIN 53,156): | 9 – 10 mm |
| Checking (DIN 53,151): | 0 |
| Mandrel bending test (DIN 53,152): | <2 mm diam. |
| Buchholz hardness (DIN 53,153): | 111 |
| Ball impact test (Gardner): | 75 in lb |

EXAMPLE 5

1.4-phenylene-bis-imidazoline was made into powder varnish or sintering powder with titanium dioxide and an opoxy resin plus a small amount of leveling agent in the following proportions:

| Composition of the Powder Varnish | |
|---|---|
| Solid epoxy resin, on the basis of an adduct of 2,2-bis-(4-hydroxyphenyl)-propane (diane) and epichlorhydrin, which had been subjected to cleavage with HCl and which, according to the manufacturer, has an epoxy equivalent weight ranging between 700 and 875, which corresponds to an epoxy value of 0.142 to 0.114. It has a softening range from 85 to 100°C | 56.3 wt-% |
| 1,4-phenylene-bis-imidazoline | 3.2 wt-% |
| TiO$_2$ in powder form | 40.0 wt-% |
| Leveling agent (same as in Example 1) | 0.5 wt-% |

After 5 minutes of setting the powdered coating on the test body at 200°C the following results were obtained:

| | |
|---|---|
| Coating thickness: | 55 – 65 μ |
| Gloss (Gardner, 60°): | 85% |
| Erichsen cupping (DIN 53,156): | 9 – 10 mm |
| Checking (DIN 53,151): | 0 |
| Mandrel bending test (DIN 53,152): | [<]2 mm diam. |
| Buchholz hardness (DIN 53,153): | 100 |
| Ball impact test (Gardner): | 80 in lb |

The following are preferred substituents on the imidazoline derivatives used in the present invention:

R is alkyl having 1 to 4 carbon atoms such methyl, ethyl, propyl n-butyl, t-butyl and the like;

R is aryl containing 6 to 10 carbon atoms in the aromatic portion, preferably phenyl and naphthyl;

R' is cycloalkyl containing from 5 to 6 carbon atoms in the ring portion such as cyclohexane or R;

R' is heterocycloalkyl containing in addition to heteroatoms N,S, and/or O, and 4 carbon atoms in the ring portion such as morpholinylmethyl, piperazinyl-methyl and the like;

R'' is unsubstituted alkylene containing from 1 to 10 carbon atoms such as methylene, propylene and the like;

R'' is alkylene as previously described substituted by aryl containing 6 to 10 carbon atoms in the aromatic portion, for example phenyl or methyl;

R'' is unsubstituted arylene such as phenylene, napthylene and the like; and

R'' is arylene as previously described substituted by aryl containing 6 to 10 carbon atoms in the aromatic portion such as phenyl and naphthyl, or by alkyl having 1 to 4 carbon atoms.

What is claimed is:

1. Powder coating composition consisting essentially of a finely divided mixture of 1,2-epoxy compounds having at least one 1,2-epoxy group in the molecule and a lower softening point greater than 40°C., and from 2 to 10% by weight of an imidazole derivative having the formula

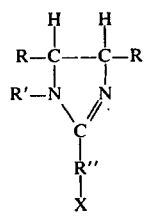

wherein
R is selected from the group of hydrogen, alkyl and aryl;
R' is selected from the group of cycloalkyl, heterocycloalkyl and R;
R'' is selected from the group of alkylene and arylene and the foregoing substituted by alkyl and/or aryl; and
X is hydrogen or the radical

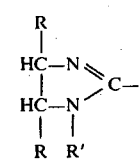

wherein R and R' are as defined previously.

2. Coating composition of claim 1 wherein imidazoline is selected from the group 2-methylimidazoline, 2,4-dimethylimidazoline, 2-ethylimidazoline, 2-ethyl-4-methylimidazoline, 2-benzylimidazoline, 2-phenylimidazoline, 2-(o-tolyl)-imidazoline, 2-(p-tolyl)-imidazoline, tetramethylene-bis-imidazoline, 1,1,3-trimethyl-1,4-tetramethylene-bis-imidazoline, 1,3,3-trimethyl-1,4-tetramethylene-bis-imidazoline, 1,1,3-trimethyl-1,4-tetramethylene-bis-4-methylimidazoline, 1,3,3-trimethyl-1,4-tetramethylene-bis-4-methylimidazoline, 1,2-phenylene-bis-imidazoline, 1,3-phenylene-bis-imidazoline, 1,4-phenylene-bis-imidazoline and 1,-4-phenylene-bis-4-methylimidazoline.

3. In a method for making coatings from powder varnishes by the elevated temperature reaction of a finely divided mixture consisting essentially of a hardner, conventional varnish additives, and 1,2-epoxy compounds having at least one 1,2-epoxy group in the molecule and a lower softening point greater than 40°C, the improvement which consists essentially of using as the hardner, from 2 to 10% by weight of an imidazoline derivatives having the formula

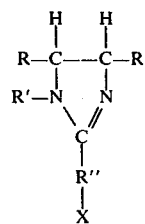

wherein
R is selected from the group of hydrogen, alkyl and aryl;
R' is selected from the group of cycloalkly, heterocycloalkyl and R;
R'' is selected from the group of alkyl and aryl substituted or unsubstituted alkylene or arylene; and
X is hydrogen or the radical

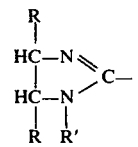

wherein R and R' are as defined previously.

* * * * *